(12) United States Patent
O'Rourke et al.

(10) Patent No.: US 9,594,567 B2
(45) Date of Patent: Mar. 14, 2017

(54) CONFIGURING A TRUSTED PLATFORM MODULE

(71) Applicant: Dell Products, LP, Round Rock, TX (US)

(72) Inventors: Andrew J. O'Rourke, Cedar Park, TX (US); Darin R. Dearwater, Temple, TX (US); Johan Rahardjo, Austin, TX (US); Jeffrey R. Azulay, Austin, TX (US)

(73) Assignee: DELL PRODUCTS, LP, Round Rock, TX (US)

( * ) Notice: Subject to any disclaimer, the term of this patent is extended or adjusted under 35 U.S.C. 154(b) by 304 days.

(21) Appl. No.: 13/772,617

(22) Filed: Feb. 21, 2013

(65) Prior Publication Data

US 2014/0237220 A1    Aug. 21, 2014

(51) Int. Cl.
*G06F 1/00* (2006.01)
*G06F 9/44* (2006.01)
*G06F 21/57* (2013.01)

(52) U.S. Cl.
CPC ............ *G06F 9/4401* (2013.01); *G06F 21/57* (2013.01)

(58) Field of Classification Search
CPC ............................... G06F 21/00; G06F 9/4401
USPC ........................................................ 713/1
See application file for complete search history.

(56) References Cited

U.S. PATENT DOCUMENTS

| 7,644,278 B2 | 1/2010 | Catherman et al. |
| 7,751,568 B2 | 7/2010 | Catherman et al. |
| 2007/0016801 A1 | 1/2007 | Bade et al. |
| 2012/0151199 A1* | 6/2012 | Shriver .............................. 713/2 |
| 2014/0040605 A1* | 2/2014 | Futral ..................... G06F 9/445 713/2 |

OTHER PUBLICATIONS

Kinney, Steven, Trusted platform Module basics: using TPM in embedded systems, 2006, Oxford, chapters 3, 6, 4, 13, and 22.*
Wikipedia, Jan. 26, 2012, en.wikipedia.org, en.wikipedia.org/wiki/Trusted_Execution_Technology and en.wikipedia.org/wiki/Unified_Extensible_Firmware_Interface#The_EFl_shell.*
Mike Dowler, How Motherboards are made: A Gigabyte Factory Tour, Aug. 28, 2008, http://www.pcstats.com/articleview.cfm?articleid=1722&page=17, the section about the "Testing Stage 2 . . . ".*
"TCG Physical Presence Interface Specification," Version 1.2; Rev. 1; Trusted Computing Group, Feb. 10, 2011, pp. 1-42.

(Continued)

*Primary Examiner* — Jaweed A Abbaszadeh
*Assistant Examiner* — Austin Hicks
(74) *Attorney, Agent, or Firm* — Larson Newman, LLP (57) ABSTRACT

A method includes storing configuration data for a Trusted Platform Module (TPM) in a pre-boot environment such as Unified Extensible Firmware Interface (UEFI), reading the configuration data, and automatically configuring the TPM based upon the configuration data. The configuring includes storing values of TPM parameters in non-volatile memory of the TPM. A method includes UEFI firmware of a circuit board on an assembly line configuring a TPM. An information handling system includes UEFI firmware and a TPM. The UEFI firmware configures the TPM from a configuration file stored in memory of the UEFI firmware.

17 Claims, 5 Drawing Sheets

(56) References Cited

OTHER PUBLICATIONS

"Trusted Platforms UEFI, PI and TCG-based firmware," Zimmer et al., White Paper by Intel Corporation and IBM Corporation, Sep. 2009, pp. 1-48.
"Creating a Secure Computing Environment: Hardware-based Security Features Further Protect Against Software-based Attacks," Intel Trusted Execution Technology Brief, 2009.
"TCG EFI Platform Specification," Version 1.20; Final Revision 1.0 7 for TPM Family 1.1 or 1.2; Jun. 2006, pp. 1-37.
"Secure Platforms Provide New Levels of Security," Brandi et al, Infineon White Paper, Technology, Implementation and Application of the Trusted Computing Group Standard (TCG), Sep. 2004, pp. 1-16.

* cited by examiner

CONFIGURING A TRUSTED PLATFORM MODULE

FIELD OF THE DISCLOSURE

This disclosure generally relates to information handling systems, and more particularly relates to configuring a Trusted Platform Module.

BACKGROUND

As the value and use of information continues to increase, individuals and businesses seek additional ways to process and store information. One option is an information handling system. An information handling system generally processes, compiles, stores, and/or communicates information or data for business, personal, or other purposes. Because technology and information handling needs and requirements can vary between different applications, information handling systems can also vary regarding what information is handled, how the information is handled, how much information is processed, stored, or communicated, and how quickly and efficiently the information can be processed, stored, or communicated. The variations in information handling systems allow for information handling systems to be general or configured for a specific user or specific use such as financial transaction processing, airline reservations, enterprise data storage, or global communications. In addition, information handling systems can include a variety of hardware and software components that can be configured to process, store, and communicate information and can include one or more computer systems, data storage systems, and networking systems. An information handling system may include a Trusted Platform Module (TPM).

BRIEF DESCRIPTION OF THE DRAWINGS

It will be appreciated that for simplicity and clarity of illustration, elements illustrated in the Figures have not necessarily been drawn to scale. For example, the dimensions of some of the elements are exaggerated relative to other elements. Embodiments incorporating teachings of the present disclosure are shown and described with respect to the drawings presented herein, in which.

The use of the same reference symbols in different drawings indicates similar or identical items.

DETAILED DESCRIPTION OF DRAWINGS

The following description in combination with the Figures is provided to assist in understanding the teachings disclosed herein. The following discussion will focus on specific implementations and embodiments of the teachings. This focus is provided to assist in describing the teachings and should not be interpreted as a limitation on the scope or applicability of the teachings. However, other teachings can certainly be utilized in this application. The teachings can also be utilized in other applications and with several different types of architectures such as distributed computing architectures, client/server architectures, or middleware server architectures and associated components.

For purposes of this disclosure, an information handling system can include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, entertainment, or other purposes. For example, an information handling system can be a personal computer, a PDA, a consumer electronics device, a network server or storage device, a switch router, wireless router, or other network communication device, or any other suitable device and can vary in size, shape, performance, functionality, and price. The information handling system can include memory, one or more processing resources such as a central processing unit (CPU) or hardware or software control logic. Additional components of the information handling system can include one or more storage devices, one or more communications ports for communicating with external devices as well as various input and output (I/O) devices, such as a keyboard, a mouse, and a video display. The information handling system can also include one or more buses operable to transmit communications between the various hardware components.

Figure 1:
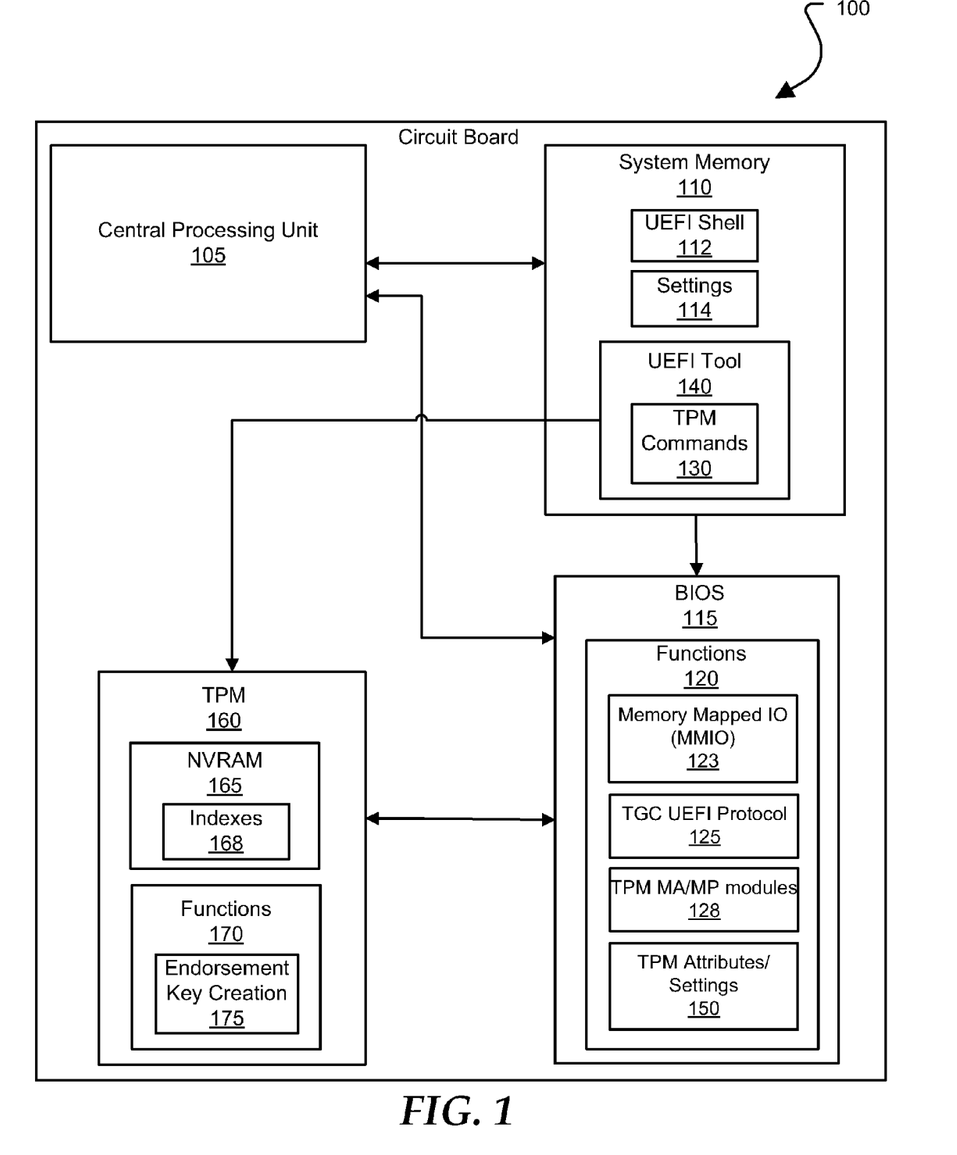
FIG. 1 illustrates a block diagram of a circuit board according to one embodiment of the disclosure.

FIG. 1 shows a circuit board 100 that includes central processing unit 105, system memory 110, Basic Input/Output System (BIOS) 115, and Trusted Platform Module (TPM) 160. System Memory includes Unified Extensible Firmware Interface (UEFI) shell 112, settings 114, and UEFI tool 140. UEFI shell 112 implements a shell for executing UEFI commands and applications. UEFI is an extension of the firmware for booting a computer and performing other operations on the computer without the aid of an operating system. UEFI is intended to be a set of defined interfaces between the system firmware (BIOS) and Operating System. A shell is a user interface to enter commands to BIOS, UEFI, other firmware, or an operating system. The shell may be small and non-intrusive. Among the commands implemented by UEFI shell 112 are commands performed by UEFI tool 140. In some embodiments, UEFI shell 112 may be a UEFI Shell 1 or a UEFI Shell 2 environment. The shell may be loaded into system memory 110 from a hard disk or Universal Serial Bus (USB) flash drive or other boot device.

Settings 114 may include the values of parameters and indexes to be set in TPM 160. In some embodiments, settings 114 may include one or more customized preconfiguration files. In further embodiments, the configuration files may be XML-based configuration files. Each configuration file may contain TPM command ordinals which are executed by a TPM controller. In these further embodiments, UEFI tool 140 may read the configuration files and issue the command ordinals to TPM 160 by communicating directly with TPM 160, thereby configuring TPM 160. UEFI tool 140 communicates directly with TPM 160 via memory mapped I/O registers (MMIO) 123. In further embodiments UEFI tool 140 may use a UEFI driver.

Circuit board 100 may also be referred to as a mother board or planar. BIOS is a component of firmware that may be loaded at boot to test the components of a computer, start the computer up, and load an operating system. BIOS 115 includes functions 120. Functions 120 perform the routines of BIOS with respect to TPM. They include MMIO 123, Unified Extensible Firmware Interface (UEFI) protocols 125, TPM Memory Absent and Memory Present modules 128, and BIOS attributes/settings for TPM 150. TCG UEFI protocols 125 include routines for communicating with TPM 160. The communications may be pursuant to standard TCG EFI protocols used for communications between BIOS and a TPM. TPM Memory Absent and Memory Present modules 128 may include TPM BIOS drivers. A BIOS Memory Absent driver module may be used in a memory-less and stack-less environment and a BIOS Memory Present driver module may runs during BIOS Power On Self Test (POST). BIOS 115 have one or both of these modules.

TPM commands 130 include routines for issuing commands to TPM 160. The commands may include such commands as self test, get capability, and generate an endorsement key. UEFI tool 140 is a shell application to aid in the development of routines to perform UEFI functions. UEFI tool 140 may contain routines to aid in configuring TPM 160. In some embodiments, UEFI tool 140 may be a 64-bit utility running in UEFI shell 112. In some embodiments, UEFI tool 140 may be built from an EFI Development Kit 2 (EDK2) environment and may run under either UEFI Shell 1 or Shell 2. In some embodiments, UEFI tool 140 may run automatically and not require any operator intervention/manual interaction to set parameters in TPM 160 and to issue commands to TPM 160 to generate an endorsement key.

In many embodiments, TPM attributes/settings 150 may contain an attributes file. When BIOS 115 is reset, it may read the attributes file and issue commands to TPM 160 based upon the entries contained in the attributes file. The commands may include such commands as activating and deactivating TPM 160, enabling and disabling it, and turning it on and off. Attributes 150 may be contained in BIOS memory. In some embodiments, the memory may consist of non-volatile memory.

TPM 160 includes non-volatile random access memory 165 (NVRAM) and functions 170. TPM 160 is a hardware-based security device and may consist of a thin-shrink small-outline package (TSSOP), a rectangular, thin body size component. TPM 160 may generate cryptographic keys and may perform cryptographic hashing, public and secret key encryption, and digital signing to authenticate transmitted information. NVRAM 165 includes indexes 168. Indexes 168 may store parameters for the operation of TPM 160, including parameters for Intel® Trusted Execution Technology (TXT) and parameters for Physical Presence Interface (PPI). TXT is a series of procedures aimed at safeguarding an execution environment. The procedures make use of a TPM. PPI may be used to implement a requirement of physical presence of an operator in making major changes to the configuration of a TPM, such as activating, deactivating, clearing or changing ownership of the TPM.

Functions 170 include encryption and hashing. In particular, functions 170 include endorsement key creation 175. An endorsement key may consist of a public/private key pair. In some embodiments, the key pair is a 2048 bit RSA key pair. The private key may be locked into TPM 160; that is, the value of the private key may be protected from extraction from TPM 160. In many embodiments, the private key may be stored in NVRAM 165. A user of a computer containing TPM 160 may prove ownership of a computer with a TPM chip produced by a trusted process by signing documents with an endorsement key. The endorsement key may be protected by a certificate.

In some embodiments, circuit board 100 may be utilized to configure TPM 160 for shipment to a customer and may represent a stage in the manufacture of a computer. In further embodiments, circuit board 100 may be placed on an assembly line and may configure TPM without the need of an operator. In many embodiments, circuit board 100 may be installed in a test fixture which is connected to a test host or host computer. The test host or host computer may power up circuit board 100 and run a test suite or set of diagnostics on the board including the UEFI tools which configure TPM 160.

Processor 105 and memory 110 may be a golden processor and golden memory, special equipment temporarily placed on a board during manufacture for use in testing and configuring the components of the board. BIOS 115 and TPM 160 may be affixed to circuit board 100 for shipment to a customer. The manufacturer may populate BIOS 115 and place BIOS 115 and TPM 160 on circuit board 100.

The populating may include storing or writing one or more customized XML-based configuration files in the test host to be loaded into settings 114 at boot. The configuration files may describe such parameters as index offset location, data size, and PS (platform supplier) policy. The values may be determined by the manufacturer based on characteristics of the information handling system containing system board 100. One set of values may be written for a server and another set of values may be written to for a laptop. In particular, the values may have been determined without reading values from TPM 160, and even before attachment of TPM 160 to circuit board 110. They may, for example, be stored in the test host, ready for use when circuit board 100 is plugged into the test host.

In operation, circuit board 100 under the control of the test host may be powered up and boot into the environment of UEFI shell 112. UEFI tool 140 and the settings 114 may be copied to UEFI shell 112 in system memory 110. The execution of BIOS commands under UEFI shell 112 may cause BIOS 115 to communicate with TPM attributes 150 in BIOS to change the state of TPM 160 In some embodiments, UEFI tool 140 may provision TPM 160 for TXT by reading TPM command ordinals from an XML-based configuration file for TXT and may issue the commands to TPM 160. The execution of the commands may program AUX and PS indexes of TPM 160 and the PS policy, and may lock TPM NVRAM 165. The AUX index is defined with the D-bit to prohibit any modification or deletion of indexes after TPM NVRAM 165 has been locked.

Similarly, in many embodiments, UEFI tool 140 may provision TPM 160 for PPI by reading TPM command ordinals from an XML-based configuration file for PPI and may issue the commands to TPM 160. Provisioning for PPI v1.2 may involve programming a PPI index in indexes 168 of TPM NVRAM 165 with a default value using the XML-based configuration file for PPI. PPI v1.2 is an extension of the provisioning process and is needed for Windows Server 2012 (Win 8) compliance.

In some embodiments, however, the commands from circuit board 100 to TPM 160 to generate an endorsement key may be issued from an operating system. In other embodiments, other firmware of a planar or circuit board, such as UEFI firmware, may store configuration data for a TPM and may communicate with the TPM to issue commands and set parameters of the TPM. UEFI firmware is firmware that provides the functionality specified by the Unified Extensible Firmware Interface specification.

Other embodiments may involve settings other than an assembly line for a circuit board. The circuit board may, for example, be a component of an information handling system shipped to an end user. The end user may store attribute data in BIOS and then boot the information handling system, causing BIOS to activate the TPM. This mechanism may enable the end user to customize the TPM.

Figure 2:
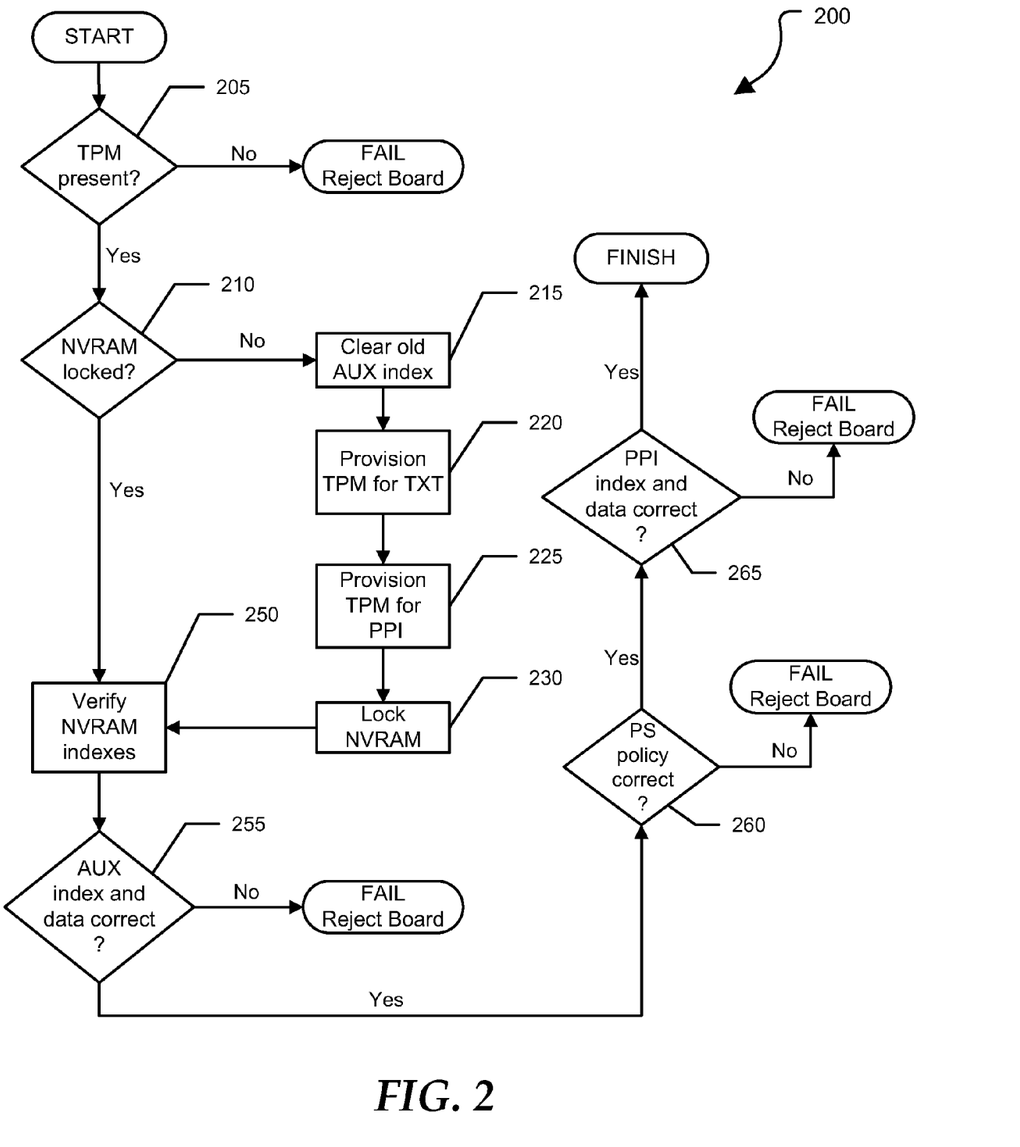
FIG. 2 is a flow diagram illustrating a method of provisioning a Trusted Platform Module (TPM) for Intel® Trusted Execution Technology (TXT) and TCG's Physical Presence Interface (PPI) according to one embodiment of the disclosure.

FIG. 2 shows a flow diagram 200 that begins at block 205 with determining the destination of a planar or circuit board such as circuit board 100 of FIG. 1. The destination may indicate whether the planar contains a TPM. If the destination of the planar is for certain countries, export restrictions may prohibit inclusion of a TPM. If the destination is the rest of the world (ROW), such as the Americas and most European countries, the planar may include a TPM. In some embodiments, the destination of the planar may be determined by scanning the part number of the planar.

If it is determined that the planar is destined for a country for which TPMs are not allowed, the planar is rejected. The remaining steps of FIG. 2 are unnecessary, since a TPM is not affixed to the planar. If, however, it is determined that the planar is destined for the rest of the world and so contains a TPM such as TPM 160 of FIG. 1, at block 210, a check is made whether the NVRAM of the planar is locked. The NVRAM of a TPM may be locked by setting a flag. Once locked, access to data of the TPM may be protected. The locking may be permanent. The setting of the flag to signify a locked state may be a one-time operation which cannot be reversed.

If the NVRAM is locked, the planar may have already been provisioned for TXT and PPI, and the process flow may proceed to block 250. If the NVRAM is not locked, at block 215, the previous contents of auxiliary index of the TPM is cleared. The auxiliary index of a TPM contains values of parameters used in the operation of the TPM. At blocks 220 and 225, the TPM is provisioned for TXT and for PPI. The provisioning includes setting the values of parameters of the TPM. The parameters set in blocks 220 and 225 may include the PPI index, the AUX index and PS policy.

The provisioning may be done through communication between the UEFI tool and the TPM, and may be achieved through the execution of commands issued under a UEFI shell of the BIOS. A UEFI tool may automate the issuance of the commands.

After the parameters for TXT and PPI are set, at block 230 the NVRAM of the TPM is locked. This prevents the values from being changed. At blocks 250 and 255, the indices of the NVRAM are verified and it is checked whether the values are correct; that is, their values are checked against the desired values. In some embodiments, the test of blocks 250 and 255 may be duplicative. The values may also be checked when they are set at blocks 225 and 230.

If the values are incorrect, the planar may be rejected. If the values are correct, the platform supplier policy (PS policy) is checked at block 260. The PS policy is part of the TXT specification. If the settings are not as desired, the planar is rejected. Otherwise, at block 265, the PPI index and data are checked. If they are not as desired, the planar is rejected. Otherwise, the method of FIG. 2 ends.

In some embodiments, the method of FIG. 2 may enable a manufacturer to customize TPMs in its planars without the need for operator interaction. A manufacturer may, for example, desire one group of settings for a server and another group of settings for a desktop or laptop to be used by an end user. In further embodiments, a UEFI tool may perform the customization of the TPM. The UEFI tool may read desired values for the settings of the TPM and may then execute commands, such as shell commands, to set the desired values in the TPM. In a few embodiments, the UEFI tool may work under both UEFI shell-1 and UEFI shell-2 environments. In other embodiments, TPM settings other than PPI and TXT settings may be automatically set on an assembly line without the need for operator intervention.

In addition, in some embodiments, the method may be completed using a standard BIOS that will ship to a customer. Moreover, the method of FIG. 2 may enable the individual configuration of the TPMs on circuit boards without loading different BIOS firmware for different configurations. Other approaches may require the same configuration for each board, unless separate software is loaded.

Figure 3:
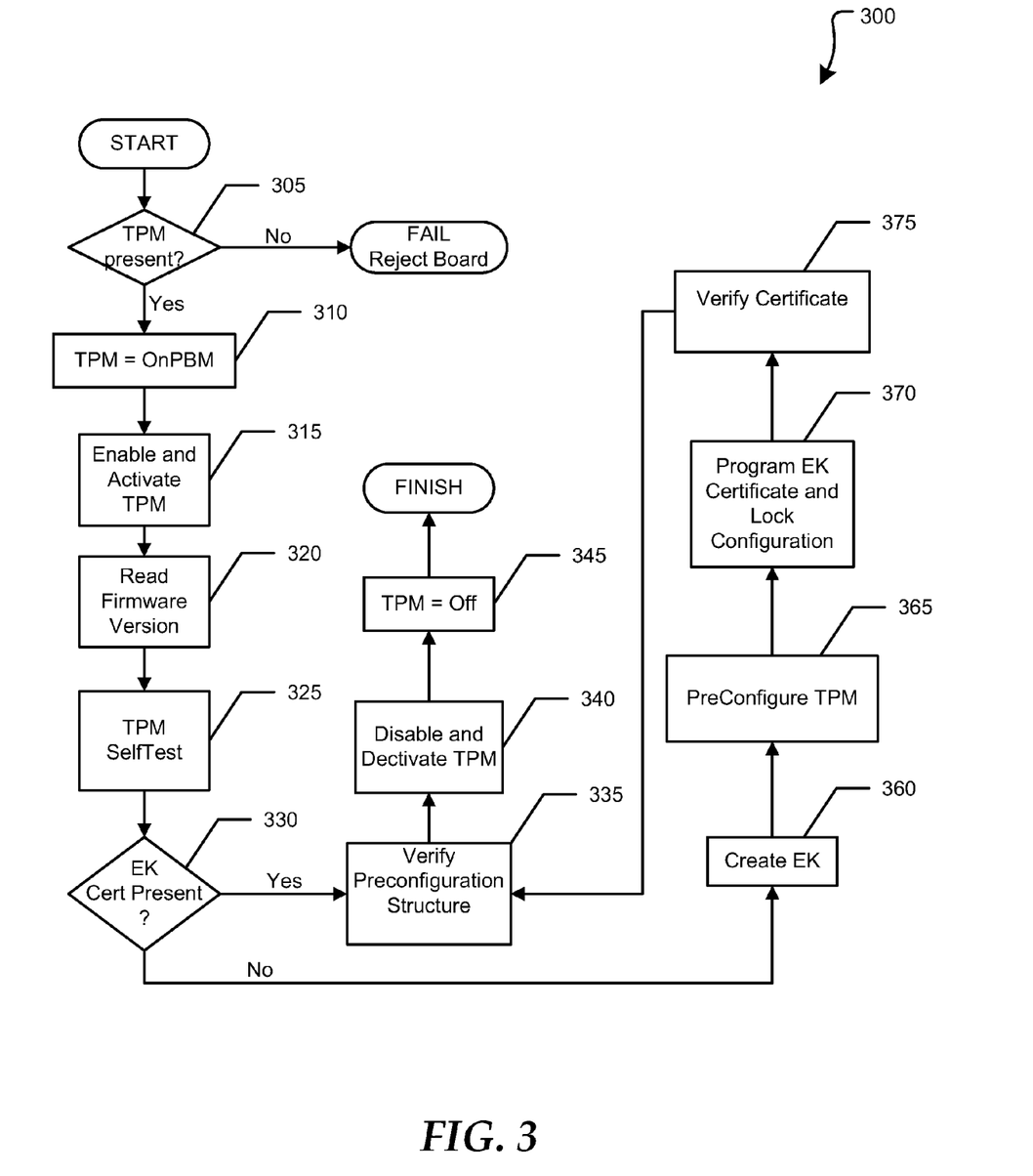
FIG. 3 is a flow diagram illustrating a method of generating an endorsement key (EK) in a TPM according to one embodiment of the disclosure.

FIG. 3 shows a flow diagram 300 of a method to generate an endorsement key of a TPM. In some embodiments, the environment may be the same as the environment for FIG. 2, with a test host and a planar populated with BIOS or other firmware and a TPM. The Test host may include a UEFI shell and a UEFI tool. In some embodiments, the method of FIG. 3 may be performed immediately after the method of FIG. 2. In other embodiments, some time may be spent testing the planar after performing the method of FIG. 2 and before executing the method of FIG. 3. In still other embodiments, the method of FIG. 3 may be performed before the method of FIG. 2.

FIG. 3 begins at block 305 with determining the destination of a planar or circuit board such as circuit board 100 of FIG. 1. The destination of the planar may indicate whether the planar contains a TPM. Block 305 may be similar to block 205 of FIG. 2. If the circuit board does not contain a TPM, the board is rejected and the method of FIG. 3 ends. Otherwise, at block 310, the TPM is turned on or enumerated by issuing the command OnPBM (On with pre-boot measurements). OnPBM Preboot mode is a TPM attribute in BIOS. In some embodiments, the command may be issued to the TPM from BIOS under a mechanism for issuing commands to a TPM from BIOS. In further embodiments, the generation of the commands from BIOS may involve BIOS attributes. An attribute may be represented by a field in tables in BIOS. A UEFI tool may access the field using a test interface which is available during the manufacturing process and may cause BIOS to issue a command to the TPM to turn on. The UEFI tool may access the attributes file when BIOS is reset; that is, turned off and turned back on. The commands described in 315 may also be issued by this same mechanism. In other embodiments, the commands to the TPM may be issued by an operating system. In those embodiments, the boot process has completed and an operating system has been loaded. In some of those other embodiments, a TPM base services driver may be installed to enable the operating system to issue a command to the TPM to generate an endorsement key. The driver may enable the operating system and applications to use services provided by the TPM.

The TPM is enabled and activated at block 315. This state is a precondition for generating an endorsement key (EK) for the TPM and programming the EK certificate. The TPM may have been placed on a circuit board in a disabled and active state, a state not suitable for generating an endorsement key. In some embodiments, the TPM may be enabled and activated automatically, without the intervention of an operator, even though the TPM Physical Presence Lifetime Lock permanent flag is set. The firmware version of the TPM is read at block 320 by using a TPM command.

Figure 4:
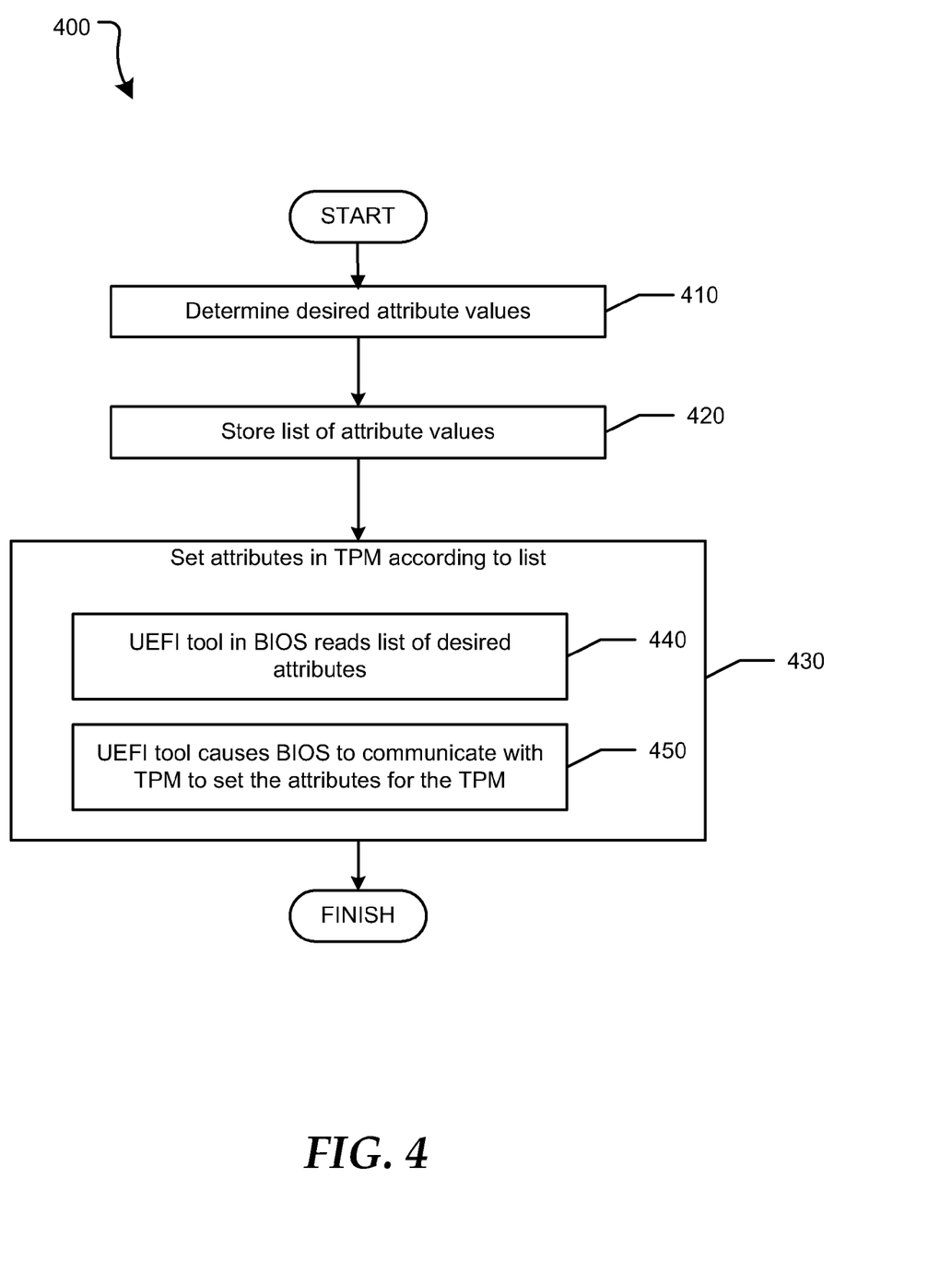
FIG. 4 is a flow diagram illustrating a method of setting attributes in BIOS for a TPM according to one embodiment of the disclosure.

Blocks 310 and 315 are explained in more detail in FIG. 4. Flow diagram 400 begins at block 410 with determining desired BIOS attribute values for a TPM, such as for TPM 160 of FIG. 1. The values may, for example, depend on the use of a planar. A manufacturer may, for example, select values based upon the intended use of its customers. A list of the attribute values is stored at block 420. In some embodiments, the list of desired attributes may be programmed into a special settings file of a BIOS of the planar. In many embodiments, the programming may occur before a TPM is affixed to the planar or before BIOS can communicate with the TPM. At block 430, the attributes of the TPM are set according to the values of the list. The setting may include a UEFI tool in BIOS reading the list of desired attributes at block 440. The UEFI tool may then cause BIOS to communicate with the TPM to set the attributes in the TPM at block 450.

Returning to FIG. 3, at block 325, a self-test of the TPM is performed by issuing a selftest command. At block 330, the TPM is tested for presence of an endorsement key certificate. If the certificate testifying to the endorsement key is not present, the endorsement key has not been generated. The method of FIG. 3 proceeds to block 360, with issuance to the TPM of a command to generate an endorsement key. If the certificate is present, the method proceeds to block 335.

At block 365, the TPM completes a sequence of preconfiguration steps. Parameters of the TPM are set based upon the contents of a preconfiguration file. This preconfiguration file is used to set the field update/firmware update capability for the TPM, the Dictionary Attack Mitigation (DAM) counter/configuration, the general purpose input/output (GPIO) configuration, the bus interface configuration, and the TPM chip Software binding configuration for the TPM. The firmware upgrade bit may control whether the TPM allows a field upgrade of its firmware.

The endorsement key certificate is locked into the TPM at block 370. As a result, the value of the endorsement key is protected from extraction from the TPM. At block 375, presence of the endorsement key certificate is verified. The certificate attests to the security of the process by which the endorsement key was generated.

At block 335, the TPM preconfiguration structure is verified. At block 340, the TPM is disabled and deactivated. This may be the state of the TPM at the beginning of the method of FIG. 3. It is also the TPM state for shipment of an information handling device to a customer. At block 345, the TPM is turned off.

In some embodiments, the method of FIG. 3 may provide a board/system-level solution to the generation of an endorsement key for a TPM, enabling the generation of an endorsement key in a TPM that is already surface mounted on a planar. In many embodiments, the method may provide an automated method of endorsement key generation. The method does not require an operator to be present to complete any of the steps in the process. Further, when the endorsement key is generated within UEFI environment, the need for loading a special OS driver to perform the function is eliminated. In addition, in some embodiments, the method of FIG. 3 may be completed using a standard BIOS that will ship to a customer.

Figure 5:
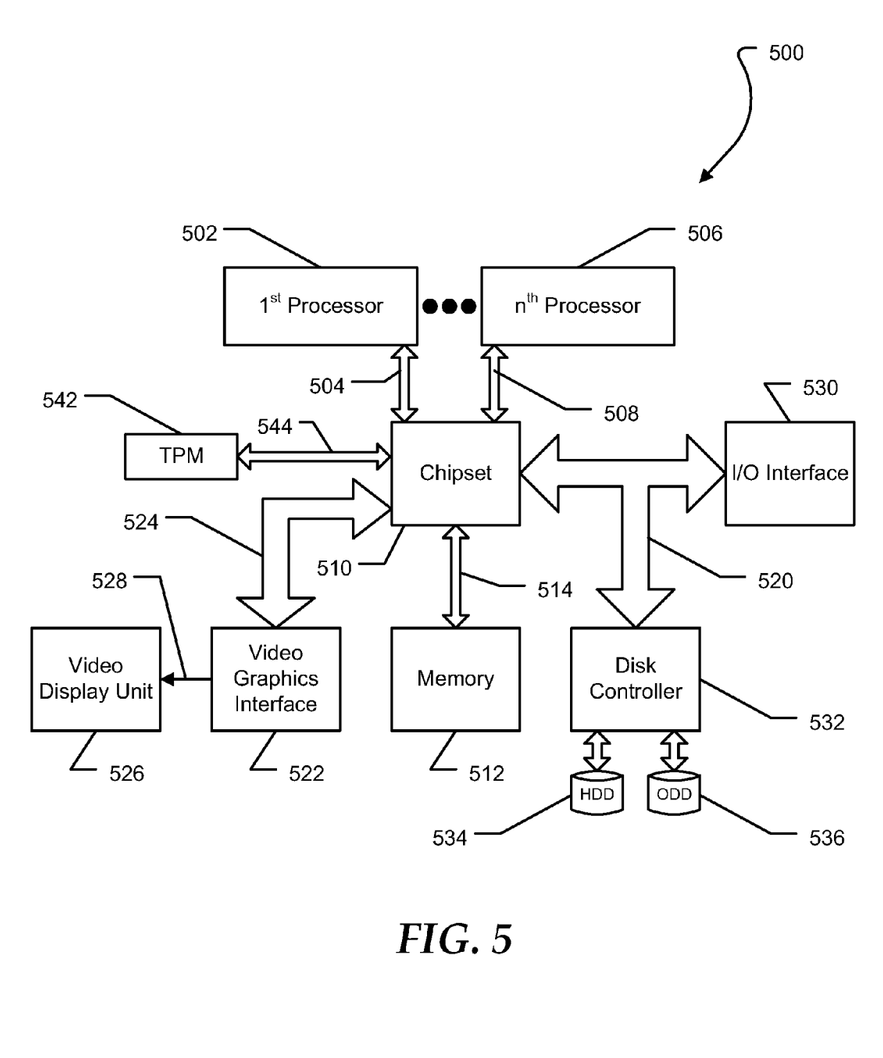
FIG. 5 illustrates a block diagram of an information handling system according to one embodiment of the disclosure.

FIG. 5 illustrates a block diagram of an exemplary embodiment of an information handling system, generally designated at 500. In one form, the information handling system 500 can include system 100 of FIG. 1 or can carry out the methods of FIG. 2, 3, or 4. The information handling system 500 can include a first physical processor 502 coupled to a first host bus 504 and can further include additional processors generally designated as $n^{th}$ physical processor 506 coupled to a second host bus 508. The first physical processor 502 can be coupled to a chipset 510 via the first host bus 504. Further, the $n^{th}$ physical processor 506 can be coupled to the chipset 510 via the second host bus 508. The chipset 510 can support multiple processors and can allow for simultaneous processing of multiple processors and support the exchange of information within information handling system 500 during multiple processing operations.

According to one aspect, the chipset 510 can be referred to as a memory hub or a memory controller. For example, the chipset 510 can include an Accelerated Hub Architecture (AHA) that uses a dedicated bus to transfer data between first physical processor 502 and the $n^{th}$ physical processor 506. For example, the chipset 510, including an AHA enabled-chipset, can include a memory controller hub and an input/output (I/O) controller hub. As a memory controller hub, the chipset 510 can function to provide access to first physical processor 502 using first bus 504 and $n^{th}$ physical processor 506 using the second host bus 508. The chipset 510 can also provide a memory interface for accessing memory 512 using a memory bus 514. In a particular embodiment, the buses 504, 508, and 514 can be individual buses or part of the same bus. The chipset 510 can also provide bus control and can handle transfers between the buses 504, 508, and 514.

According to another aspect, the chipset 510 can be generally considered an application specific chipset that provides connectivity to various buses, and integrates other system functions. For example, the chipset 510 can be provided using an Intel® Hub Architecture (IHA) chipset that can also include two parts, a Graphics and AGP Memory Controller Hub (GMCH) and an I/O Controller Hub (ICH). For example, an Intel 820E, an 815E chipset, or any combination thereof, available from the Intel Corporation of Santa Clara, Calif., can provide at least a portion of the chipset 510. The chipset 510 can also be packaged as an application specific integrated circuit (ASIC).

The information handling system 500 can also include a video graphics interface 522 that can be coupled to the chipset 510 using a third host bus 524. In one form, the video graphics interface 522 can be a Peripheral Component Interconnect (PCI) Express interface to display content within a video display unit 526. Other graphics interfaces may also be used. The video graphics interface 522 can provide a video display output 528 to the video display unit 526. The video display unit 526 can include one or more types of video displays such as a flat panel display (FPD) or other type of display device.

The information handling system 500 can also include an I/O interface 530 that can be connected via an I/O bus 520 to the chipset 510. The I/O interface 530 and I/O bus 520 can include industry standard buses or proprietary buses and respective interfaces or controllers. For example, the I/O bus 520 can also include a PCI bus or a high speed PCI-Express bus. In one embodiment, a PCI bus can be operated at approximately 66 MHz and a PCI-Express bus can be operated at approximately 528 MHz. PCI buses and PCI-Express buses can be provided to comply with industry standards for connecting and communicating between various PCI-enabled hardware devices. Other buses can also be provided in association with, or independent of, the I/O bus 520 including, but not limited to, industry standard buses or proprietary buses, such as Industry Standard Architecture (ISA), Small Computer Serial Interface (SCSI), Inter-Integrated Circuit (I²C), System Packet Interface (SPI), or Universal Serial buses (USBs). The information handling system 500 can contain a TPM 542 connected to chipset 510 by bus 544. Bus 544 may be a low pin count (LPC) bus or an SPI bus.

In an alternate embodiment, the chipset 510 can be a chipset employing a Northbridge/Southbridge chipset configuration (not illustrated). For example, a Northbridge portion of the chipset 510 can communicate with the first physical processor 502 and can control interaction with the memory 512, the I/O bus 520 that can be operable as a PCI bus, and activities for the video graphics interface 522. The Northbridge portion can also communicate with the first physical processor 502 using first bus 504 and the second bus 508 coupled to the $n^{th}$ physical processor 506. The chipset 510 can also include a Southbridge portion (not illustrated) of the chipset 510 and can handle I/O functions of the chipset 510. The Southbridge portion can manage the basic forms of I/O such as Universal Serial Bus (USB), serial I/O, audio outputs, Integrated Drive Electronics (IDE), and ISA I/O for the information handling system 500.

The information handling system 500 can further include a disk controller 532 coupled to the I/O bus 520, and connecting one or more internal disk drives such as a hard disk drive (HDD) 534 and an optical disk drive (ODD) 536 such as a Read/Write Compact Disk (R/W CD), a Read/Write Digital Video Disk (R/W DVD), a Read/Write mini-Digital Video Disk (R/W mini-DVD), or other type of optical disk drive.

Although only a few exemplary embodiments have been described in detail above, those skilled in the art will readily appreciate that many modifications are possible in the exemplary embodiments without materially departing from the novel teachings and advantages of the embodiments of the present disclosure. Accordingly, all such modifications are intended to be included within the scope of the embodiments of the present disclosure as defined in the following claims. In the claims, means-plus-function clauses are intended to cover the structures described herein as performing the recited function and not only structural equivalents, but also equivalent structures.

What is claimed is:

1. An information handling system comprising:
   a processor;
   a Trusted Platform Module (TPM); and
   a first non-volatile memory to store Unified Extensible Firmware Interface (UEFI) system Basic Input/Output System (BIOS) firmware
   and data to provision the TPM for operation, execution of the firmware by the processor to:
   read the data from the first non-volatile memory; and
   send commands to the TPM, the commands to provision the TPM based upon the data, the provisioning including storing TPM parameters in a second non-volatile memory within the TPM,
   wherein the data includes data to provision the TPM for generation of an endorsement key by the TPM, and the provisioning includes the UEFI system BIOS firmware issuing a command to the TPM to generate an endorsement key based upon the data.

2. The information handling system of claim 1, wherein the provisioning comprises provisioning the TPM for Intel's Trusted Execution Technology and provisioning the TPM for Physical Presence Interface.

3. The information handling system of claim 1, wherein the provisioning comprises a UEFI tool running in a UEFI shell to read the data and to provision the TPM based upon the data.

4. The information handling system of claim 1, wherein the provisioning comprises:
   resetting the UEFI system BIOS firmware; and
   in response to the resetting, the UEFI system BIOS firmware reading the data and issuing commands to the TPM based upon the data, the commands including the command to the TPM to generate the endorsement key.

5. The information handling system of claim 1, further comprising an operating system to issue a command to the TPM to generate an endorsement key.

6. The information handling system of claim 5, further comprising a TPM base services driver to enable the operating system to issue the command to the TPM to generate the endorsement key.

7. The system of claim 1, wherein the data is received from a test system external to the information handling system.

8. A method comprising:
   receiving data during the manufacture of an information handling system, the data to provision a Trusted Platform Module (TPM) for operation;
   storing the data in a first non-volatile memory at the information handling system, wherein Unified Extensible Firmware Interface (UEFI) system Basic Input/Output System (BIOS) firmware is stored in the first non-volatile memory;
   reading, by the UEFI system BIOS firmware, the data; and
   provisioning the TPM based upon the data, the provisioning comprising the UEFI system BIOS firmware storing TPM parameters in a second non-volatile memory within the TPM,
   wherein the data includes data to provision the TPM for generation of an endorsement key by the TPM, and the provisioning includes the UEFI system BIOS firmware issuing a command to the TPM to generate an endorsement key based upon the data.

9. The method of claim 8, wherein the provisioning comprises provisioning the TPM for Trusted Execution Technology and provisioning the TPM for Physical Presence Interface.

10. The method of claim 8, wherein:
    the reading comprises a UEFI tool running in a UEFI shell reading the data; and
    the provisioning comprises the UEFI tool provisioning the TPM based upon the data.

11. The method of claim 8, further comprising an operating system issuing a command to the TPM to generate an endorsement key.

12. The method of claim 11, further comprising loading a TPM base services driver to enable the operating system to issue the command to the TPM to generate the endorsement key.

13. The method of claim 8, wherein the data is received from a test system external to the information handling system.

14. A method comprising:
    receiving data during the manufacture of an information handling system, the data to provision a Trusted Platform Module (TPM) for operation;
    storing the data in a first non-volatile memory of a circuit board on an assembly line of an original equipment manufacturer (OEM) for the manufacture of the information handling system, wherein a Unified Extensible Firmware Interface (UEFI) system Basic Input/Output System (BIOS) firmware is stored in the first non-volatile memory;

attaching the TPM to the circuit board;

reading, by the UEFI system BIOS firmware, the data;

provisioning the TPM based upon the data, the provisioning including setting TPM parameters, the TPM parameters stored in a second non-volatile memory within the TPM; and shipping the information handling system to a customer, wherein the data includes data for the generation of an endorsement key by the TPM, and the provisioning includes:

the UEFI system BIOS firmware issuing a command to the TPM to generate an endorsement key based upon the data; and the TPM generating an endorsement key in response to the command.

15. The method of claim 14, wherein the provisioning comprises running the circuit board under a test host.

16. The method of claim 14, further comprising:

attaching a golden processor to the circuit board; and attaching a golden memory to the circuit board, wherein the golden processor and golden memory are used during the provisioning of the TPM and the golden processor and golden memory are replaced on the circuit board before shipping the information handling system to the customer.

17. The method of claim 14, wherein the provisioning comprises provisioning the TPM based upon characteristics of the information handling system pursuant to a policy of the OEM.

\* \* \* \* \*